United States Patent
Russo

(10) Patent No.: US 12,520,114 B2
(45) Date of Patent: Jan. 6, 2026

(54) TEST SENSOR SYSTEMS AND METHODS USING THE SAME

(71) Applicant: Ascensia Diabetes Care Holdings AG, Basel (CH)

(72) Inventor: Anthony P. Russo, New York, NY (US)

(73) Assignee: Ascensia Diabetes Care Holdings AG, Basel (CH)

( * ) Notice: Subject to any disclaimer, the term of this patent is extended or adjusted under 35 U.S.C. 154(b) by 361 days.

(21) Appl. No.: 17/102,820

(22) Filed: Nov. 24, 2020

(65) Prior Publication Data
US 2022/0167135 A1   May 26, 2022

(51) Int. Cl.
*H04W 4/80* (2018.01)
*G01N 27/327* (2006.01)

(52) U.S. Cl.
CPC .......... *H04W 4/80* (2018.02); *G01N 27/3272* (2013.01); *G01N 27/3273* (2013.01)

(58) Field of Classification Search
CPC ....... H04W 4/80; G01N 27/3272–3273; A61B 2560/045; A61B 5/0022; A61B 5/1486; A61B 5/14532; A61B 2562/0295
See application file for complete search history.

(56) References Cited

U.S. PATENT DOCUMENTS 9,456,259 B1 *   9/2016   Liao ..................... A61B 5/0205
2007/0270672 A1 *  11/2007   Hayter ............. A61B 5/150526
                                                    600/309
2008/0217407 A1 *   9/2008   Ackermann ........... G16H 40/40
                                                    235/439
2010/0069730 A1 *   3/2010   Bergstrom ........... A61B 5/0002
                                                    604/131
2010/0241030 A1 *   9/2010   Fowler ................... A61B 5/157
                                                    600/583

(Continued)

FOREIGN PATENT DOCUMENTS

JP   2014219392 A   11/2014
JP   2018504660 A   2/2018

OTHER PUBLICATIONS

Escobedo et al., General-purpose passive wireless point-of-care platform based on smartphone, Biosensors and Bioelectronics, 2019, 141, 111360 (Year: 2019).*

(Continued)

*Primary Examiner* — Shizhi Qian
(74) *Attorney, Agent, or Firm* — Erise IP, P.A.

(57) ABSTRACT

A system for determining analyte information of a fluid sample includes an electrochemical test sensor, an NFC-enabled dongle and an NFC-enabled reader. The test sensor includes a base, an enzyme adapted to react with the analyte, electrodes and test-sensor contacts. The NFC-enabled dongle includes a near field communication (NFC) tag chip, an analog front end (AFE), and a microcontroller. The dongle includes an exterior covering that forms an opening for receiving the test sensor. The NFC-enabled reader wirelessly receives data from the dongle to assist in determining the analyte information of the fluid sample. Another system for determining analyte information of a fluid sample includes an electrochemical test sensor, a Bluetooth-enabled dongle and a Bluetooth-enabled reader.

20 Claims, 10 Drawing Sheets

(56) References Cited

U.S. PATENT DOCUMENTS

| | | | | |
|---|---|---|---|---|
| 2010/0258438 | A1* | 10/2010 | Tokunaga | C12Q 1/001 204/403.01 |
| 2013/0325352 | A1* | 12/2013 | Greene | G16H 15/00 702/19 |
| 2014/0318986 | A1* | 10/2014 | Elder | G01N 27/3273 205/782 |
| 2015/0130628 | A1 | 5/2015 | Kyung | |
| 2015/0196258 | A1* | 7/2015 | Strickland | H04W 4/70 370/328 |
| 2015/0207796 | A1* | 7/2015 | Love | H04L 63/10 726/4 |
| 2017/0014822 | A1 | 1/2017 | Ker | |
| 2017/0026723 | A1* | 1/2017 | Wan | H04W 4/70 |
| 2017/0293732 | A1* | 10/2017 | Cohen | A61B 5/1495 |
| 2017/0325724 | A1* | 11/2017 | Wang | A61B 5/6833 |
| 2018/0075222 | A1* | 3/2018 | Chen | G16H 40/63 |
| 2018/0153450 | A1* | 6/2018 | Routh | A61B 5/7445 |
| 2018/0249919 | A1* | 9/2018 | Pont | A61B 5/14552 |
| 2018/0328911 | A1 | 11/2018 | Sams | |
| 2020/0365240 | A1 | 11/2020 | Chen | |
| 2021/0378601 | A1* | 12/2021 | Kumar | A61B 5/7275 |

OTHER PUBLICATIONS

Heller et al., Electrochemical glucose sensors and their applications in diabetes management, Chem. Rev., 2008, 108, 2482-2505 (Year: 2008).*

Zhu et al., Nonenzymatic wearable sensor for electrochemical analysis of perspiration glucose, ACS Sensors, 2018, 3, 1135-1141 (Year: 2018).*

Zhu et al., Supporting Information of Nonenzymatic wearable sensor for electrochemical analysis of perspiration glucose, ACS Sensors, 2018, 3, 1135-1141 (Year: 2018).*

Liu et al., HealthKiosk: a family-based connected healthcare system for long-term monitoring, IEEE Infocom 2011 Workshop on M2MCN—2011 (Year: 2011).*

Stine J. M., BPOD: a wireless integrated sensor platform for continuous localized bioprocess monitor, Master thesis, University of Maryland, 2019 (Year: 2019).*

International Search Report and Written Opinion in International Application No. PCT/IB2021/060838, mailed Nov. 23, 2021 (16 pages).

PCT Patent Application PCT/IB2021/060838 Notification of Transmittal of The International Preliminary Report on Patentability issued Feb. 3, 2023.

PCT Patent Application PCT/IB2021/060838 International Search Report and Written Opinion issued Nov. 11, 2022.

Japanese Patent Application 2023-530775, Office Action, issued Sep. 9, 2025.

European Patent Application 21830758.5 Office Action issued Apr. 29, 2025.

* cited by examiner

TEST SENSOR SYSTEMS AND METHODS USING THE SAME

FIELD OF THE INVENTION

The present invention relates generally to a system and methods of using an electrochemical test sensor for determining an analyte concentration. More specifically, the present invention generally relates to a system using an electrochemical test sensor and methods for determining an analyte concentration in the absence of an analyte meter.

BACKGROUND OF THE INVENTION

The quantitative determination of analytes in body fluids is of great importance in the diagnoses and maintenance of certain physical conditions. For example, lactate, cholesterol and bilirubin should be monitored in certain individuals. In particular, it is important that individuals with diabetes frequently check the glucose level in their body fluids to regulate the glucose intake in their diets. The results of such tests can be used to determine what, if any, insulin or other medication needs to be administered. In one type of blood-glucose testing system, test sensors are used to test a fluid sample of blood.

In a typical scenario, to determine an analyte concentration, a user would carry a plurality of test sensors (e.g., electrochemical test sensors) and an analyte meter (e.g., a blood glucose meter). An analyte meter typically includes an opening to receive a test sensor, a memory, a processor, a display for showing the testing results, and a plurality of buttons or other mechanisms to navigate the display. The analyte meter may require some user setup and a learning curve associated with it.

It would be desirable to streamline such an approach to provide maximum user convenience, while still providing desired features of a typical analyte-determining system.

SUMMARY

According to one embodiment, a system for determining analyte information of a fluid sample includes an electrochemical test sensor, an NFC-enabled dongle and an NFC-enabled reader. The electrochemical test sensor is adapted to receive the fluid sample of an analyte. The electrochemical test sensor includes a base. The base includes an enzyme adapted to react with the analyte. The electrochemical test sensor further includes a plurality of electrodes and plurality of test-sensor contacts. The NFC-enabled dongle includes a near field communication (NFC) tag chip, an analog front end (AFE), and a microcontroller. The NFC-enabled dongle includes an exterior covering. The exterior covering forms an opening for receiving the electrochemical test sensor. The NFC-enabled reader is configured to wirelessly receive data from the NFC-enabled dongle to assist in determining the analyte information of the fluid sample.

According to another embodiment, a system for determining analyte information of a fluid sample includes an electrochemical test sensor, a Bluetooth-enabled dongle and a Bluetooth-enabled reader. The electrochemical test sensor is adapted to receive the fluid sample of an analyte. The electrochemical test sensor includes a base. The base includes an enzyme adapted to react with the analyte. The electrochemical test sensor further includes a plurality of electrodes and plurality of test-sensor contacts. The Bluetooth-enabled dongle includes a Bluetooth chip, an analog front end (AFE), a microcontroller and a battery. The Bluetooth-enabled dongle includes an exterior covering. The exterior covering forms an opening for receiving the electrochemical test sensor. The Bluetooth-enabled reader is configured to wirelessly receive data from the Bluetooth-enabled dongle to assist in determining the analyte information of the fluid sample.

According to one method, analyte information of a fluid sample is determined using an electrochemical test sensor, an NFC-enabled dongle and an NFC-enabled reader. The electrochemical test sensor adapted to receive the fluid sample of an analyte is provided. The electrochemical test sensor includes a base. The base includes an enzyme adapted to react with the analyte. The electrochemical test sensor further includes a plurality of electrodes and a plurality of test-sensor contacts. The NFC-enabled dongle is provided and includes a field communication (NFC) tag chip, an analog front end (AFE), a microcontroller. The NFC-enabled dongle includes an exterior covering. The exterior covering forms an opening for receiving the electrochemical test sensor. The electrochemical test sensor is placed into electrical communication with the NFC-enabled dongle via the opening of the NFC-enabled dongle. The fluid sample contacts with the electrochemical test sensor. The near field communication (NFC) tag chip and the analog front end (AFE) is powered. The analog front end assists in starting an electrochemical reaction with the analyte of the fluid sample. The NFC-enabled dongle and the electrochemical test sensor are brought in close proximity to an NFC-enabled reader. Data is wirelessly transmitted from the NFC-enabled dongle via the NFC tag chip to the NFC-enabled reader. Analyte information of the fluid sample is determined via the NFC-enabled reader using the data received from the NFC-enabled dongle.

According to another method, analyte information of a fluid sample is determined using an electrochemical test sensor, a Bluetooth-enabled dongle and a Bluetooth-enabled reader. The electrochemical test sensor adapted to receive the fluid sample of an analyte is provided. The electrochemical test sensor includes a base. The base includes an enzyme adapted to react with the analyte. The electrochemical test sensor further includes a plurality of electrodes and a plurality of test-sensor contacts. The Bluetooth-enabled dongle is provided and includes a Bluetooth chip, an analog front end (AFE), a microcontroller. The Bluetooth-enabled dongle includes an exterior covering. The exterior covering forms an opening for receiving the electrochemical test sensor. The electrochemical test sensor is placed into electrical communication with the Bluetooth-enabled dongle via the opening of the Bluetooth-enabled dongle. The fluid sample is contacted with the electrochemical test sensor. The Bluetooth chip and the analog front end (AFE) are powered. The analog front end assists in starting an electrochemical reaction with the analyte of the fluid sample. The Bluetooth-enabled dongle is brought in fairly close proximity to a Bluetooth-enabled reader. The data is wirelessly transmitted from the Bluetooth-enabled dongle via the Bluetooth chip to the Bluetooth-enabled reader. Analyte information of the fluid sample is determined via the Bluetooth-enabled reader using the data received from the Bluetooth-enabled dongle.

The above summary is not intended to represent each embodiment or every aspect of the present invention. Additional features and benefits of the present invention are apparent from the detailed description and figures set forth below.

BRIEF DESCRIPTION OF THE DRAWINGS

Other advantages of the invention will become apparent upon reading the following detailed description and upon reference to the drawings in which.

Figure 1A:
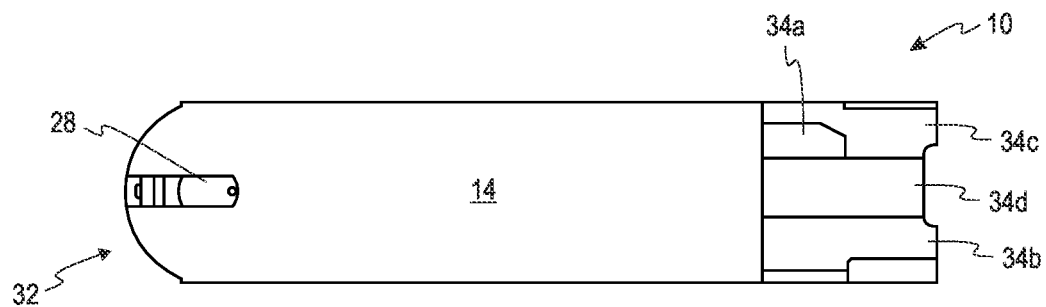
FIG. 1A is a top view of an electrochemical test sensor according to one embodiment to be used in the system.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The electrochemical test sensors are adapted to receive a fluid sample. The test sensor assists in determining information related to analytes such as analyte concentrations. As used within this application, the term "concentration" refers to an analyte concentration, activity (e.g., enzymes and electrolytes), titers (e.g., antibodies), or any other measure concentration used to measure the desired analyte. Analytes that may be measured include glucose, lipid profiles (e.g., cholesterol, triglycerides, LDL and HDL), microalbumin, hemoglobin A1C, urea, creatinine, fructose, lactate, or bilirubin. It is contemplated that other analyte concentrations may be determined. The analytes may be in, for example, a whole blood sample, a blood serum sample, a blood plasma sample, other body fluids like ISF (interstitial fluid) and urine, and non-body fluids.

In one embodiment, an electrochemical test sensor is adapted to receive a fluid sample including an analyte. The electrochemical test sensor as discussed below will be used in conjunction with an NFC-enabled dongle or a Bluetooth-enabled dongle.

The electrochemical test sensor comprises a base. The base includes an enzyme adapted to react with the analyte. The electrochemical test sensor further including a plurality of electrodes and a plurality of test sensor contacts.

The present invention is advantageous in that the electrochemical test sensors function in the absence of an analyte meter (e.g., a glucose meter). Thus, an analyte meter is not used with the electrochemical test sensor of the present invention. Here, a user conveniently avoids needing to carry an analyte meter for determining analyte concentrations. The user will need, however, to carry a near field communication (NFC)-enabled dongle or a Bluetooth-enabled dongle. Furthermore, unlike with using traditional analyte meters, there is little to no set-up and learning curve involved with the methods of the present invention.

The present invention is also advantageous in its ability to more easily modify the algorithms for calculating the analyte concentrations. In the present invention, the algorithm may be part of an NFC-enabled reader (e.g., a smartphone) in an application or could exist in, for example, a server farm in the cloud. In another embodiment, the algorithm may be part of an BLE-enabled reader (e.g., a smartphone) in an application or could exist in, for example, a server farm in the cloud. It is convenient and significantly easy to update the algorithm in the present invention for the users and, thus, updates can be more frequent, if desired. This is in contrast to modifying algorithms stored in firmware in an analyte meter that would need to support, for example, in an over-an-air update or replacing the entire analyte meter. This would also not only be much more difficult to update, but costly as well, especially if the analyte meter needed to be replaced.

The test sensors described herein are electrochemical test sensors. One non-limiting example of an electrochemical test sensor is shown in FIGS. 1A-1D. FIGS. 1A-1D depict an electrochemical test sensor 10 including a base 12, a lid 14, a fluid-receiving area or channel 16, and a plurality of electrodes 18, 20, 22 and 24. The fluid-receiving area 16 in one embodiment is a capillary channel. The plurality of electrodes includes a counter electrode 18, a working (measuring) electrode 20, a detection fill electrode 22 and a hematocrit electrode 24. The fluid-receiving area 16 provides a flow path for introducing the fluid sample into the electrochemical test sensor 10. The electrodes 18, 20, 22 and 24 are coupled to a respective one of a plurality of conductive leads 26a, 26b, 26c and 26d that communicate with a plurality of test-sensor contacts 34a, 34b, 34c and 34d. The plurality of electrodes may be made from a variety of conductive materials including, but not limited to, gold, platinum, rhodium, palladium, ruthenium, carbon or combinations thereof.

It is contemplated that less than four electrodes may be used in other embodiments. For example, in one embodiment, an electrochemical test sensor may include two electrodes (a working electrode and a counter electrode). In another embodiment, an electrochemical test sensor may include three electrodes (a working electrode, a counter electrode and a detection fill electrode). It is contemplated that other electrodes may be used in the electrochemical test sensors.

The reagent area 28 includes at least one reagent for converting the analyte of interest (e.g., glucose) in the fluid sample (e.g., blood) into a chemical species that is electrochemically measurable, in terms of the electrical current it produces, by the components of the electrode pattern. The reagent typically includes an analyte-specific enzyme that reacts with the analyte and with an electron acceptor to produce an electrochemically measurable species that may be detected by the electrodes. If the analyte is glucose, the reagent would include an enzyme such as glucose oxidase or glucose dehydrogenase.

The reagent typically includes a mediator that assists in transferring electrons between the analyte and the electrodes. Non-limiting examples of mediators include phenoxazines, phenothizaines, ferricyanide or a tetrazolium salt among others familiar to those skilled in the art. The reagent may include binders that hold the enzyme and mediator together, buffers, cellulose polymers, surfactants, other inert ingredients, or combinations thereof.

A fluid sample (e.g., blood) is applied to the reagent area 28 via the fluid-receiving area 16 in one embodiment. The fluid sample reacts with the at least one reagent. After reacting with the reagent and in conjunction with the plurality of electrodes, the fluid sample produces electrical signals that will assist in determining the analyte concentration. The conductive leads 26a-26d carry the electrical signals back to respective test sensor contacts 34a-34d.

Figure 1B:
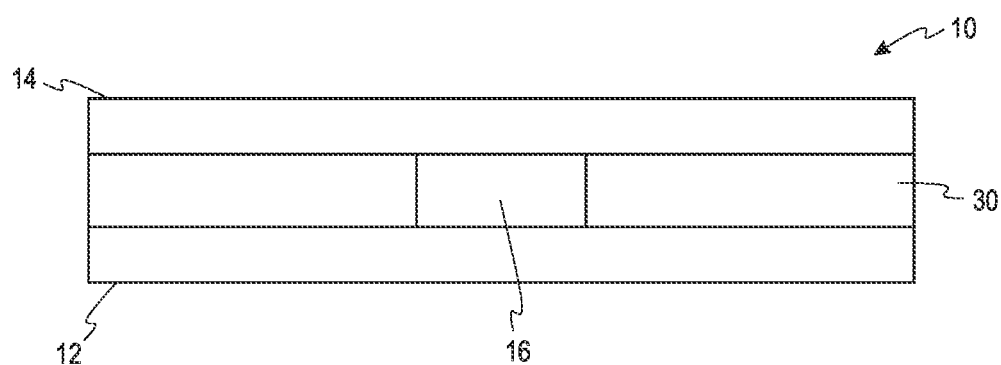
FIG. 1B is a front view of the electrochemical test sensor of FIG. 1A.
Figure 1C:
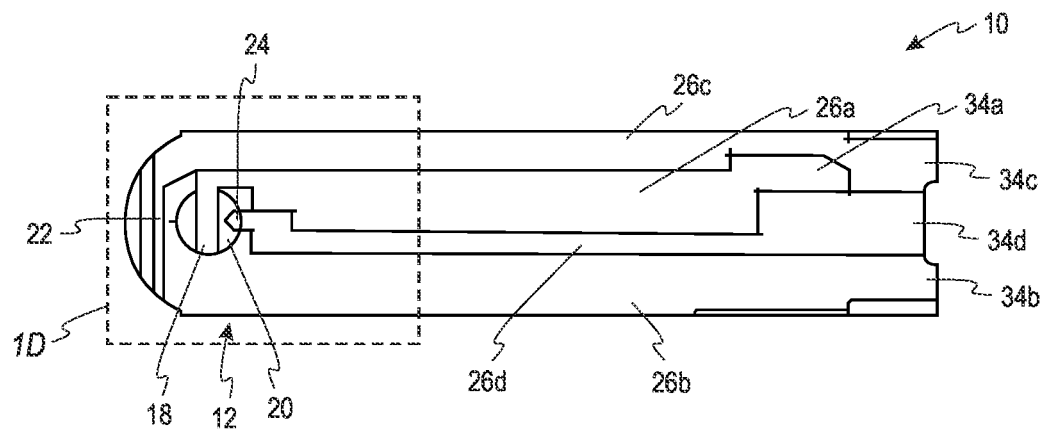
FIG. 1C is a top view of the electrochemical test sensor of FIG. 1A after the lid and the spacer have been removed.
Figure 1D:
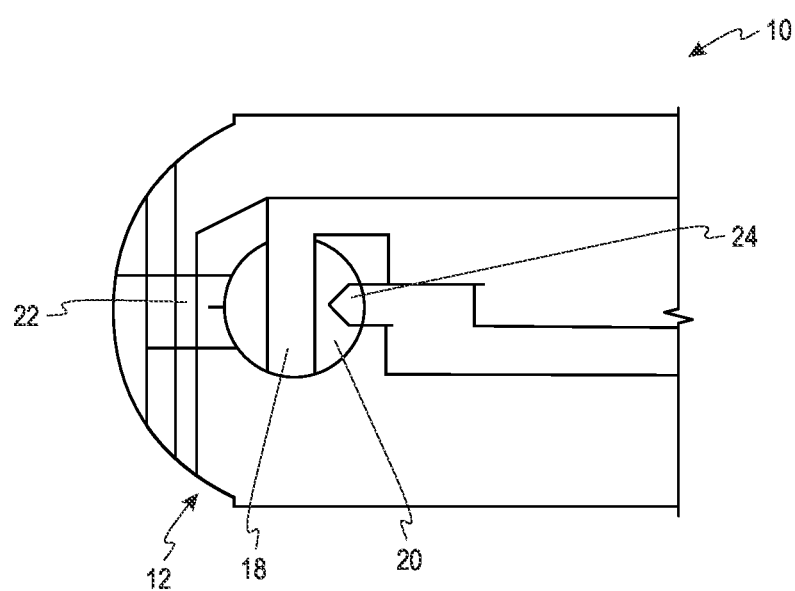
FIG. 1D is an enlarged view of generally rectangular area 1D shown in FIG. 1C.

Referring to FIG. 1B, a front view of the electrochemical test sensor 10 of FIG. 1A is shown. As shown in FIG. 1B, the electrochemical test sensor 10 includes the lid 14, a spacer 30 and the base 12. The combination of the lid 14, the spacer 30 and the base 12 forms the fluid-receiving area 16. The base 12, the lid 14 and the spacer 30 may be made from a variety of materials such as polymeric materials. Non-limiting examples of polymeric materials that may be used to form the base 12, the lid 14, and the spacer 30 include polycarbonate, polyethylene terephthalate (PET), polyethylene naphthalate (PEN), polyimide, and combinations thereof. It is contemplated that the base, spacer and lid may be independently made of other materials. It is contemplated that other materials may be used in forming the base 12, lid 14, and/or spacer 30.

To form the electrochemical test sensor 10 of FIGS. 1A-1D, the base 12, the spacer 30, and the lid 14 are attached by, for example, an adhesive or heat sealing. When the base 12, the lid 14, and the spacer 30 are attached, the fluid-receiving area 16 is formed. As shown in FIG. 1A, the fluid-receiving area 16 is formed at a first end or testing end 32 of the electrochemical test sensor 10.

It is also contemplated that the electrochemical test sensor may be formed in the absence of a spacer. For example, the electrochemical test sensor may include a base and a lid such that a fluid-receiving area (e.g., a capillary channel) is formed when the base and the lid are attached to each other. It is contemplated that the electrochemical test sensor may be formed only using the base.

Figure 2A:
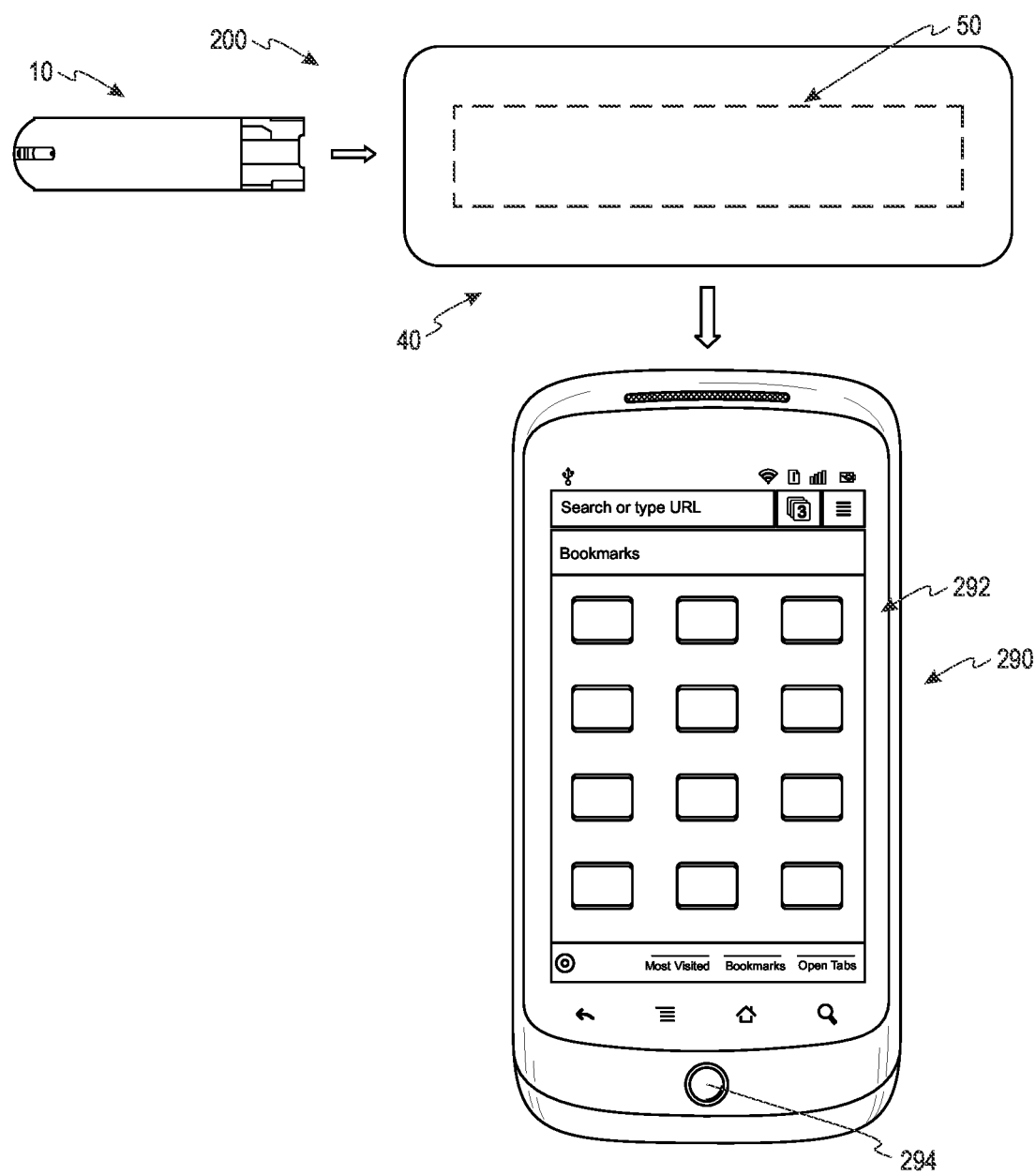
FIG. 2A is a system including the electrochemical test sensor of FIGS. 1A and 1C, a near field communication (NFC)-enabled dongle and a near field communication (NFC)-enabled reader according to one embodiment.
Figure 2B:
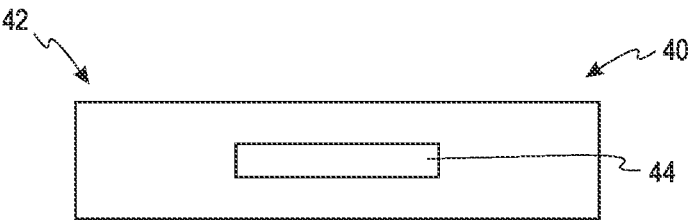
FIG. 2B is a front view of the NFC-enabled dongle shown in FIG. 2A.

Referring to FIGS. 1A, 2A and 2B, a system 200 includes the electrochemical test sensor 10, a near field communication (NFC)-enabled dongle 40 and a near field communication (NFC)-enabled reader 290. The NFC-enabled dongle in one embodiment is small and lightweight. The dongle can be made a bit heaver, if desired, to assist in improving ergonomic considerations.

The NFC-enabled dongle 40 includes a near field communication (NFC) tag chip 50, an analog front end (AFE) and a microcontroller. Referring specifically to FIG. 2B, the NFC-enabled dongle 40 includes an exterior covering 42. The exterior covering 42 is typically made of polymeric material. It is contemplated that the dongle may be made of other materials. The exterior covering 42 forms an opening 44 for receiving the electrochemical test sensor 10. The exterior covering 42 of the dongle assists in protecting the components contained therein.

The NFC tag chip 50 may be secured to the NFC-enabled dongle 40 by, for example, suitable adhesives and/or mechanical coupling mechanisms such as prongs. It is contemplated that other methods may be used in securing the NFC tag chip to the NFC-enabled dongle. The NFC tag chip 50 in one embodiment is located in an interior of the NFC-enabled dongle 40.

Near field communication (NFC) includes a small antenna and hardware to communicate via the NFC standard. Near field communication (NFC) is a known worldwide standard that provides wireless data connectivity at a close proximity. NFC is currently used for communication distances of about 20 cm or less, and more likely less than about 10 cm or less. In other embodiments, NFC is typically used in communication distances of less than about 8 cm or less than 6 cm. In another embodiment, NFC is more commonly used in communication distances of less than about 5 or about less than about 4 cm. The NFC tag chip wirelessly communicates with the NFC-enabled reader when in close proximity.

Near field communication (NFC) allows for simplified transactions, data exchange, and connections with a touch. Formed in 2004, the Near Field Communication Forum (NFC Forum) promotes sharing, pairing, and transactions between NFC-enabled readers or devices and develops and certifies device compliance with NFC standards. NFC operates at 13.56 MHz on ISO/IEC 18000-3 air interface and at rates ranging from 106 kbit/s to 848 kbit/s. NFC's short range helps keep encrypted information private. Thus, an NFC-enabled reader such as, for example, a smartphone, tablet, computer or kiosk can receive information from the NFC-enabled dongle to assist in determining an analyte concentration.

Figure 3A:
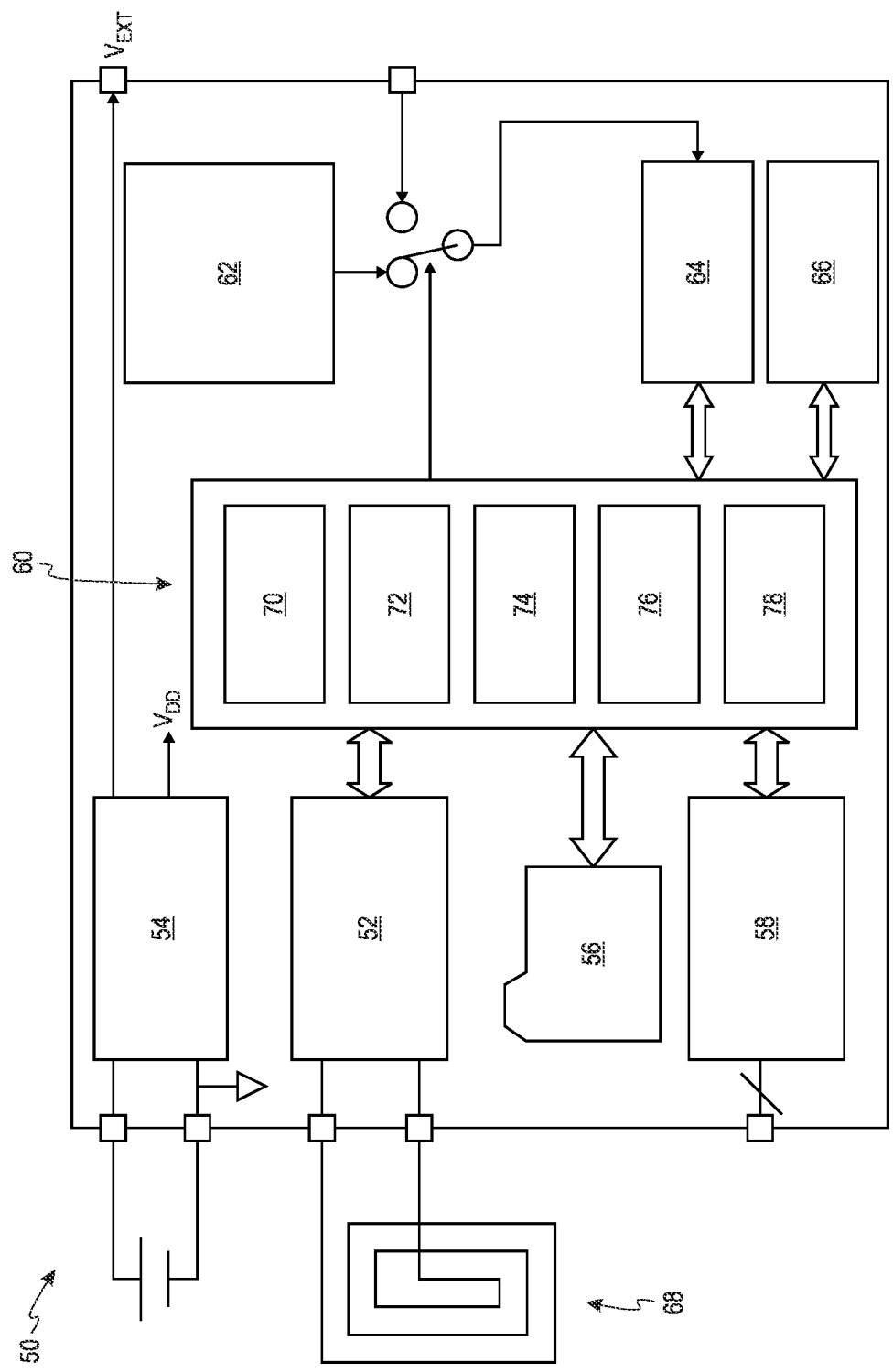
FIG. 3A is a schematic of the near field communication (NFC) tag chip used in the system of FIG. 2A.

Referring specifically to FIG. 3A, the near field communication (NFC) tag chip 50 includes an analog front end (AFE) 52, a power management module 54, memory 56, a serial periphery interface (SPI slave) 58, a microcontroller 60, an on-chip temperature sensor 62, an analog/digital (A/D) converter 64, a real-time clock 66 and an antenna 68. The microcontroller 60 also includes a control or processing logic module 70, a memory interface 72, a cryptographic module 74, an authentication module 76, and an anti-collision module 78 in one embodiment. It is noted that all NFC tag chips do not include all of these modules or features. For example, some NFC tag chips do not include temperature sensors.

In this embodiment, the NFC-enabled dongle 40 does not include a battery. In this embodiment, the near field communication (NFC) tag chip 50 has the ability to receive power from an NFC-enabled reader. Thus, the NFC-enabled dongle 40 is fully passive. NFC in this embodiment involves an initiator (an NFC-enabled reader) and a target (NFC-enabled dongle 40). The initiator actively generates an RF field that powers a passive target (NFC-enabled dongle 40). This enables NFC targets to take very simple form factors such as tags or stickers that do not require batteries.

Figure 3B:
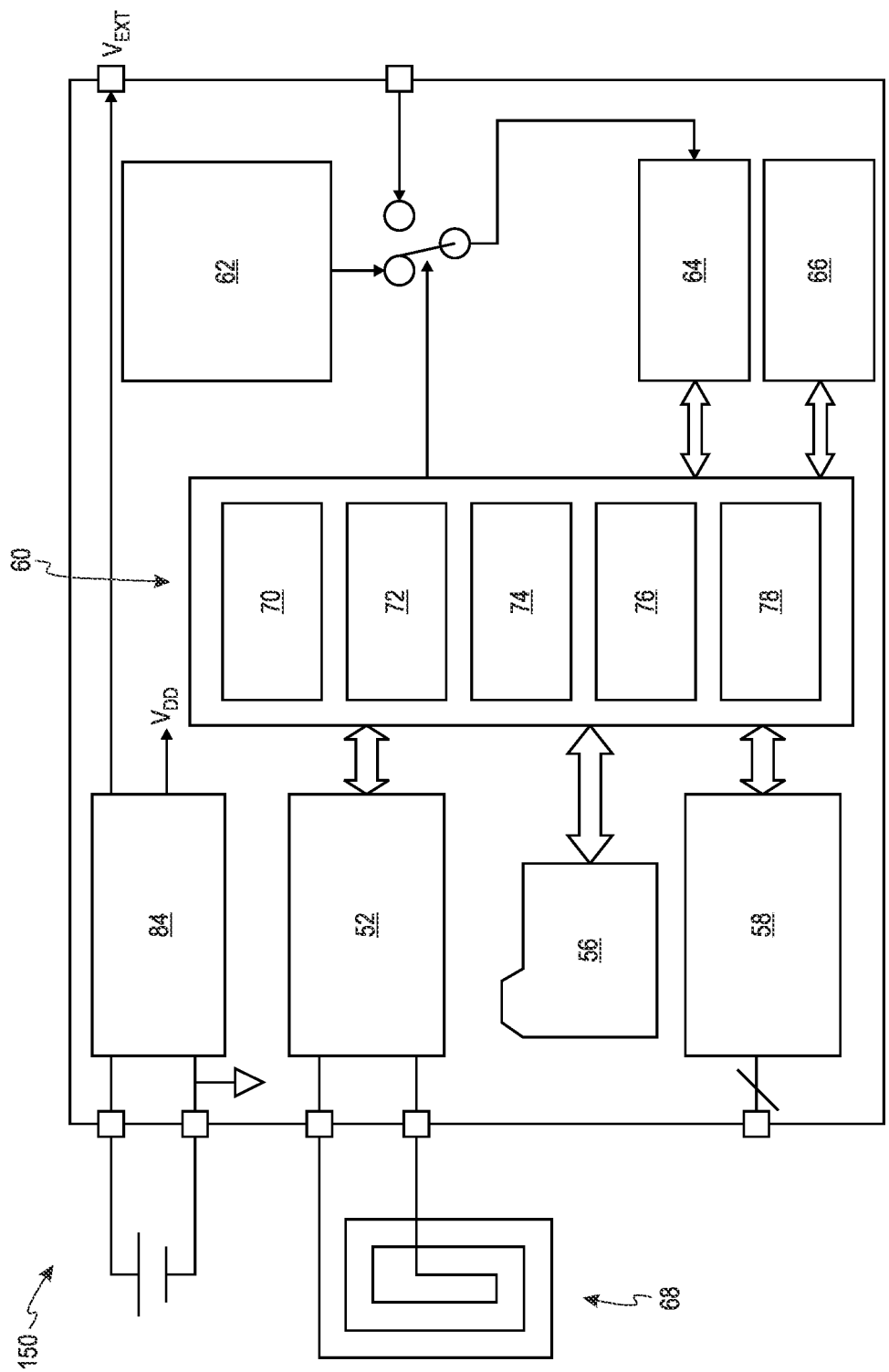
FIG. 3B is a schematic of a NFC tag chip according to another embodiment.
Figure 4A:
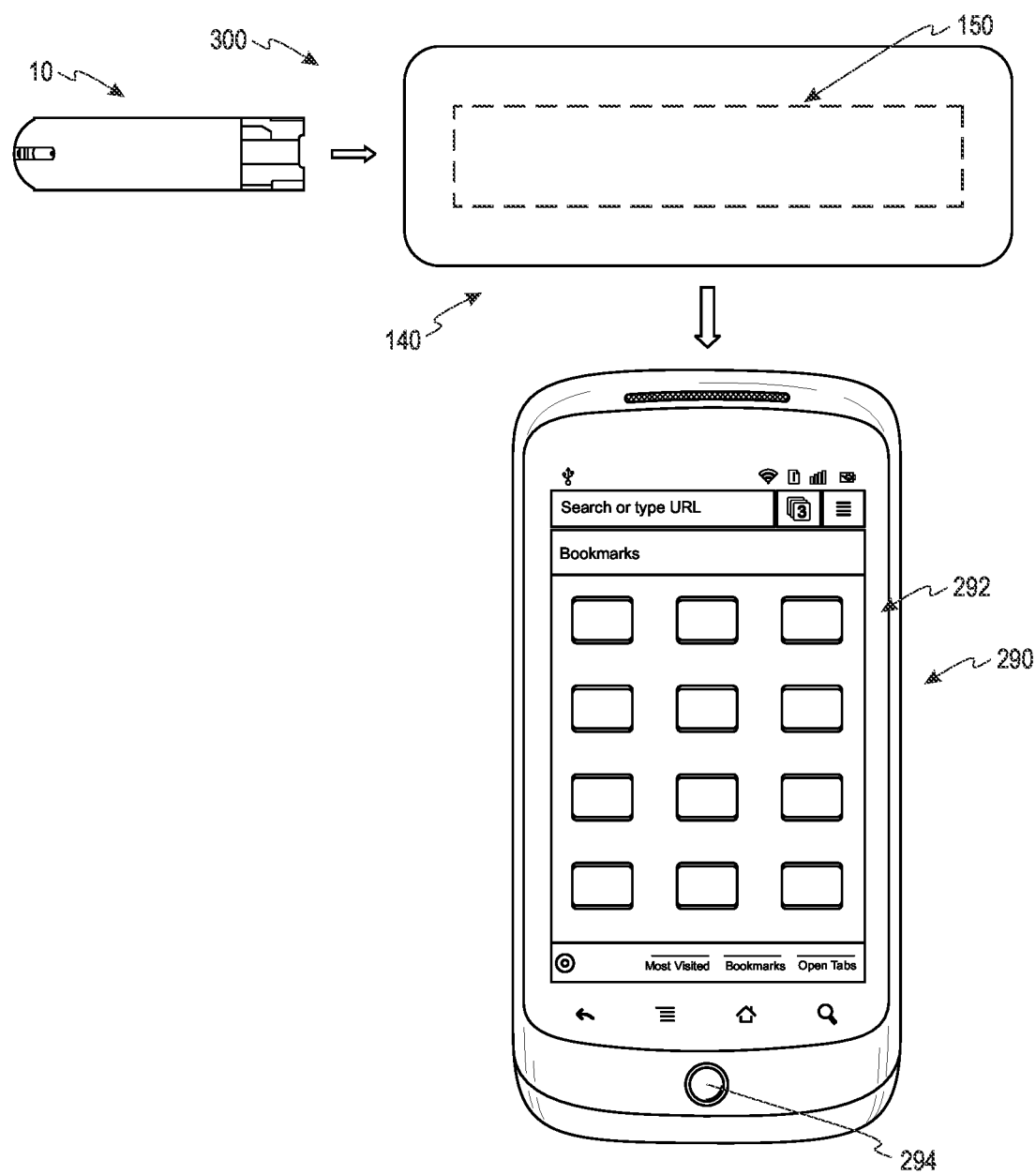
FIG. 4A is a system including the electrochemical test sensor of FIGS. 1A and 1C, an NFC-enabled dongle and a NFC-enabled reader according to another embodiment.
Figure 4B:
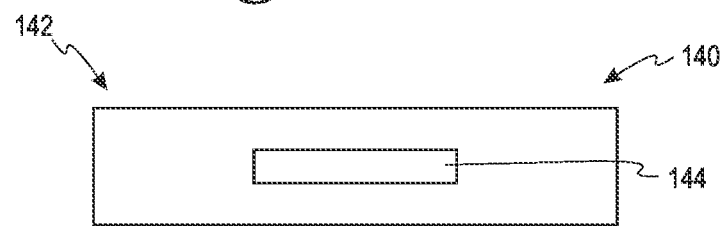
FIG. 4B is a front view of the NFC-enabled dongle shown in FIG. 4A.

In another embodiment, the NFC-enabled dongle may include a battery to power the near field communication (NFC) and/or the AFE module for signal sampling. Referring to FIG. 3B, an NFC tag chip 150 includes a battery 84. The NFC tag chip 150 includes all of the modules as described in the NFC tag chip 50 except for the power management module 54, which is not needed when the battery 84 is included. In one embodiment, the battery 84 is a 1.5 or 3V battery used to power the NFC tag chip 150. NFC peer-to-peer communication is of course possible where both devices are powered. For example, an NFC-enabled dongle with the NFC tag chip may be configured to implement a peer-to-peer communication with an NFC-enabled reader. Referring to FIGS. 4A and 4B, a system 300 includes the NFC-enabled dongle 140 with the NFC tag chip 150 and the NFC-enabled reader 290.

A non-limiting commercial example of a near field communication (NFC) tag chip, which includes a microcontroller and an analog front end (AFE), that may be used in the present invention is SL13A-AQFM manufactured/marketed by Ams.

A non-limiting commercial example of a near field communication (NFC) tag chip that may be used in the present invention is the NTAG 210μ family of tags manufactured/marketed by NXP Semiconductors of The Netherlands. Another non-limiting commercial example of a near field communication (NFC) tag chip, which includes a microcontroller, that may be used in the present invention is the ST25T family of tags manufactured/marketed by ST Microelectronics of Switzerland. Another non-limiting commercial example of a near field communication (NFC) tag chip, which includes an analog front end (AFE), that may be used in the present invention is the ST25R3916/7 manufactured/marketed by ST Microelectronics of Switzerland.

The analog front end (AFE) 52 is used to drive the electrochemistry and sample the results. In one embodiment, the analog front end 52 applies voltage to the reagent area 28 that starts the electrochemical reaction between the reagent and the analyte in the fluid sample. The resulting current produced from the electrochemical reaction in this embodiment is sampled by the analog front end 52. This measured value of the current is wirelessly transmitted to the NFC-enabled reader for further processing.

In one embodiment, the analog front end (AFE) is powered via the NFC-enabled reader such as shown in the NFC tag chip 50 in FIG. 3A. In another embodiment, the AFE is powered by the battery 84 located on the NFC tag chip 150 as shown in FIG. 3B. A non-limiting commercial example of an analog front end (AFE) that may be used in the present invention is AFE4400 manufactured/marketed by Texas Instruments of the USA.

The memory 56 of the NFC tag chip 50 is typically in the form of an EEPROM. One non-limiting example of memory that may be used is 8 kbit EEPROM. It is contemplated that other forms of EEPROM or other types of memory may be used. For example, flash memory may be used in the NFC tag chip.

The microcontroller 60 in the NFC-enabled dongle 40 executes operations involved with receiving and sending signals through the antenna 68 to the NFC-enabled reader. The microcontroller 60 assists in controlling the analog front end (AFE) 52 and converting electrical signals to readable data. The microcontroller 60 directs the analog front end (AFE) 52 to start sampling. The NFC-enabled dongle desirably includes a low-end microprocessor. The low-end microprocessor does not run one or more algorithms to determine analyte information of the fluid sample. A non-limiting commercial example of a microcontroller that may be used in the present invention is the LPC800 series manufactured/marketed by NXP Semiconductors of the Netherlands.

It is contemplated that the analog front end (AFE), microcontroller and near field communicator (NFC) may be separate chips or components. The NFC tag chip in these embodiments would be considered a lower end tag chip. It is contemplated that two or more of these components may be integrated together. In one non-limiting example, the analog front end (AFE) and near field communicator (NFC) are integrated together. In another example, the microcontroller and the near field communicator (NFC) are integrated together. In a further example, the analog front end (AFE) and microcontroller are integrated together. It is contemplated that the analog front end (AFE), microcontroller and near field communicator (NFC) may all be integrated together such as shown with the NFC chip tag 50 in FIG. 2A.

In one embodiment, a system for determining analyte information (e.g., analyte concentration) includes an electrochemical test sensor, an NFC-enabled dongle and an NFC-enabled reader. The NFC-enabled reader is configured to wirelessly receive data from the NFC-enabled dongle to assist in determining the analyte concentration of the fluid sample. The electrochemical test sensor is adapted to receive a fluid sample including an analyte. The electrochemical test sensor comprises a base. The base includes an enzyme adapted to react with the analyte. The electrochemical test sensor further including a plurality of electrodes and a plurality of test sensor contacts. The NFC-enabled dongle includes a near field communication (NFC) tag chip, an analog front end (AFE) and a microcontroller. One non-limiting example of an electrochemical test sensor that may be used is the electrochemical test sensor 10. One non-limiting example that may be used is the NFC-enabled dongle 40.

Referring back to FIG. 2A, the system 200 includes the electrochemical test sensor 10, the NFC-enabled dongle 40 and the NFC-enabled reader 290. NFC-enabled readers can read NFC chip tags on the NFC-enabled dongle to get information therefrom. The NFC-enabled reader typically is a smartphone, tablet or computer. It is also contemplated that other NFC-enabled readers may be used. For example, the NFC-enabled reader may be a kiosk. The kiosk may be a kiosk specifically designed for use in determining an analyte concentration of a fluid sample. The kiosk may be useful in health care settings such as a hospital.

The NFC-enabled reader 290 includes a display 292 and one or more buttons 294 or other mechanisms for navigating the display 292. The display 292 is typically used to show analyte information or other information of the fluid sample. The display 292 may be analog or digital. The display 292 may be a LCD, a LED, an OLED, a vacuum fluorescent, or other display adapted to show numerical readings such as analyte information. It is contemplated that the analyte information (e.g., analyte concentration) may be conveyed in an audio communication from the NFC-enabled reader.

To assist in determining analyte information (e.g., analyte concentration), in one embodiment, one or more algorithms are downloaded to the NFC-enabled reader 290. Here, the NFC-enabled reader is shown as a smartphone. As discussed above, the NFC-enabled reader may be a tablet, computer or a kiosk. The NFC-enabled reader using the one or more algorithms will take the raw data from the NFC-enabled dongle that is wirelessly transmitted and calculate the analyte information. The one or more algorithms may be downloaded and stored in the NFC-enabled reader.

In another embodiment, the near field communication (NFC) tag chip in the NFC-enabled dongle may include and transmit read-only data. This read-only data identifies the electrochemical test sensor to the NFC-enabled reader. The reader recognizes the read-only data and runs the proper one or more algorithms to determine the analyte information (e.g., analyte concentration).

In a further embodiment, the NFC-enabled reader may include log-in information for a user before using the algorithm to assist in collecting and categorizing the data. The data may be stored locally in the NFC-enabled reader or may be sent externally to another storage location, such as a cloud-based storage location. It is contemplated that the data may be sent to other locations.

Figure 5:
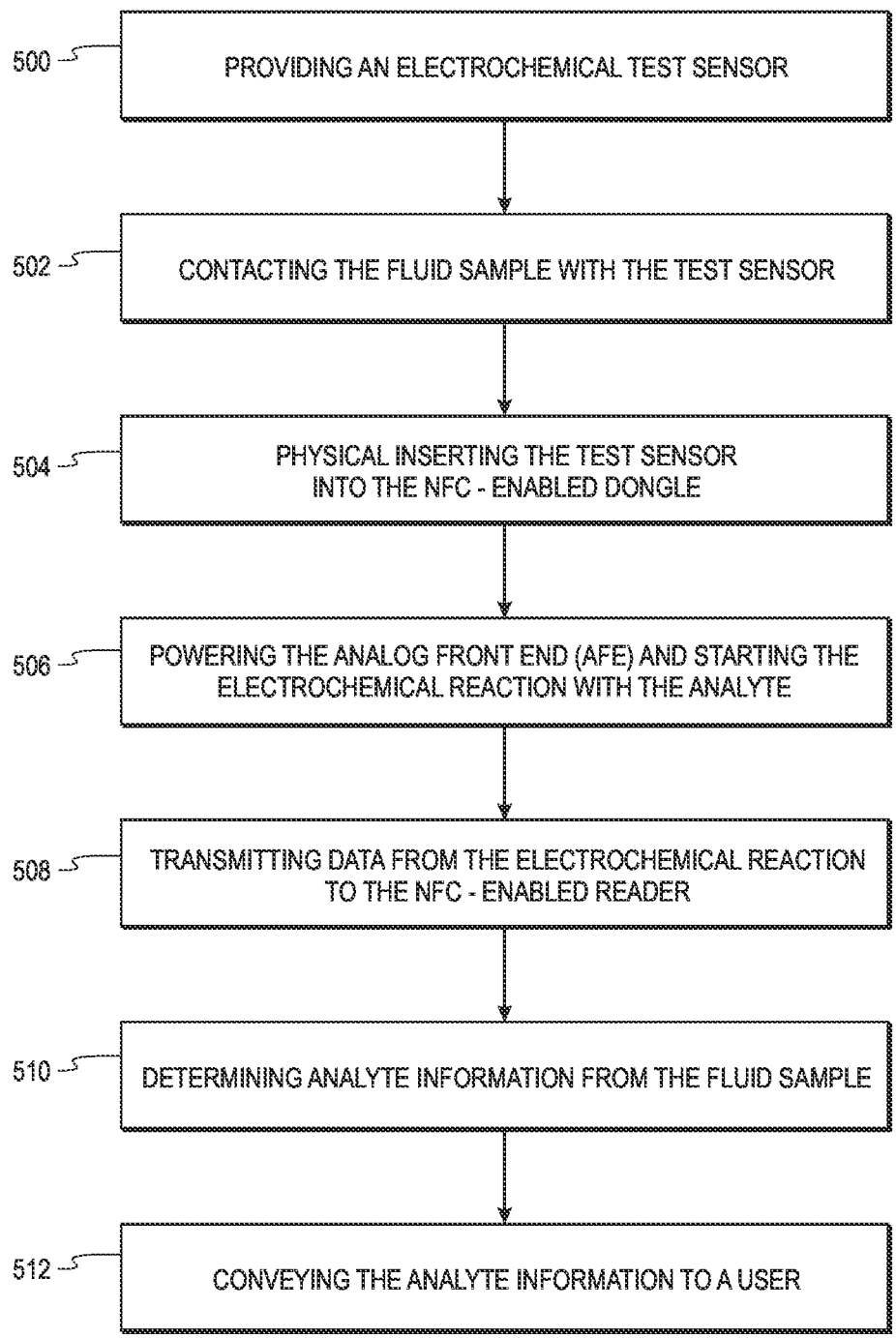
FIG. 5 is a flow chart of steps to determine analyte information according to one method.

One method is shown in the flowchart of FIG. 5 and includes steps for determining and conveying analyte information to a user. Referring to FIG. 5, step 500 provides an electrochemical test sensor. In step 502, the fluid sample contacts the electrochemical test sensor. Step 504 physical inserts the electrochemical test sensor into the NFC-enabled dongle. Step 506 powers the analog front end (AFE) and starts the electrochemical reaction with the analyte. In step 508, data is transmitted from the electrochemical reaction to the NFC-enabled reader. In step 510, analyte information (e.g., analyte concentration) is determined from the fluid sample. In step 512, the analyte information is conveyed to a user using the NFC-enabled reader.

In one method, the analyte information of a fluid sample is determined. An electrochemical test sensor is provided. For example, the electrochemical test sensor that may be used is the electrochemical test sensor 10. The fluid sample contacts the reagent area 28 via the fluid-receiving area 16. In one method, the fluid sample is obtained by pricking a finger. In this case, the fluid sample is blood. The fluid sample may be obtained by other methods. It is contemplated that other fluids may be used. The electrochemical test sensor is physical inserted into the NFC-enabled dongle.

In one method, the NFC-enabled dongle with the inserted electrochemical test sensor is brought or placed in close proximity to a NFC-enabled reader. It is contemplated that the NFC-enabled dongle may be brought or placed in close proximity to a NFC-enabled reader and then the electrochemical test sensor is physical inserted into the NFC-enabled dongle.

In one method, after bringing the NFC-enabled dongle in close proximity to the NFC-enabled reader, the near field communication (NFC) tag chip 50, including the analog front end (AFE) 52, is powered. In one non-limiting example, a tap of an NFC-enabled device to the NFC-enabled dongle can be used to instantly share the analyte information of the electrochemical test sensor. Tapping an NFC-enabled reader or device to the NFC-enabled dongle can be used to establish a wireless connection between the two devices.

In another example, the NFC-enabled dongle can be in close proximity as discussed above. NFC is currently used for communication distances of about 20 cm or less, and more likely about 10 cm or less. In other embodiments, the NFC is typically used in communication distances of less than about 8 cm or less than 6 cm. In another embodiment, the NFC is more commonly used in communication distances of less than about 5 or about less than about 4 cm. The NFC chip tag of the NFC-enabled dongle wirelessly communicates with the NFC-enabled reader when in close proximity.

The analog front end 52 assists in starting an electrochemical reaction with the analyte after receiving instructions from the microprocessor 60. After the reaction has started, data from the electrochemical reaction via the NFC tag chip of the NFC-enabled dongle is wirelessly transmitted to the NFC-enabled reader. The analyte information of the fluid sample is determined on the NFC-enabled reader using the data received from the NFC-enabled dongle and at least one algorithm. The algorithm may be stored on NFC-enabled reader or in server farms in the cloud.

In one method, the analog front end (AFE) assists in starting the electrochemical reaction with the analyte by providing at least one voltage to the fluid sample resulting in current formed from the electrochemical reaction. The analog front end may provide an excitation signal to start the electrochemical reaction. During electrochemical analyses, an excitation signal is applied to the sample of the biological fluid. The excitation signal may be a potential or current and may be constant, variable, or a combination thereof. The excitation signal may be applied as a single pulse or in multiple pulses, sequences, or cycles. Various electrochemical processes may be used such as amperometry, coulometry, voltammetry, gated amperometry, gated voltammetry, and the like.

In one method, the near field communication (NFC) tag chip 50 is powered by the NFC-enabled reader. The NFC-enabled reader may be the NFC-enabled readers discussed above, including the NFC-enabled reader 290. In another method, as discussed with respect to FIG. 3B, the battery 84 powers the NFC tag chip 150 and/or the AFE module 52 for signal sampling.

Figure 6A:
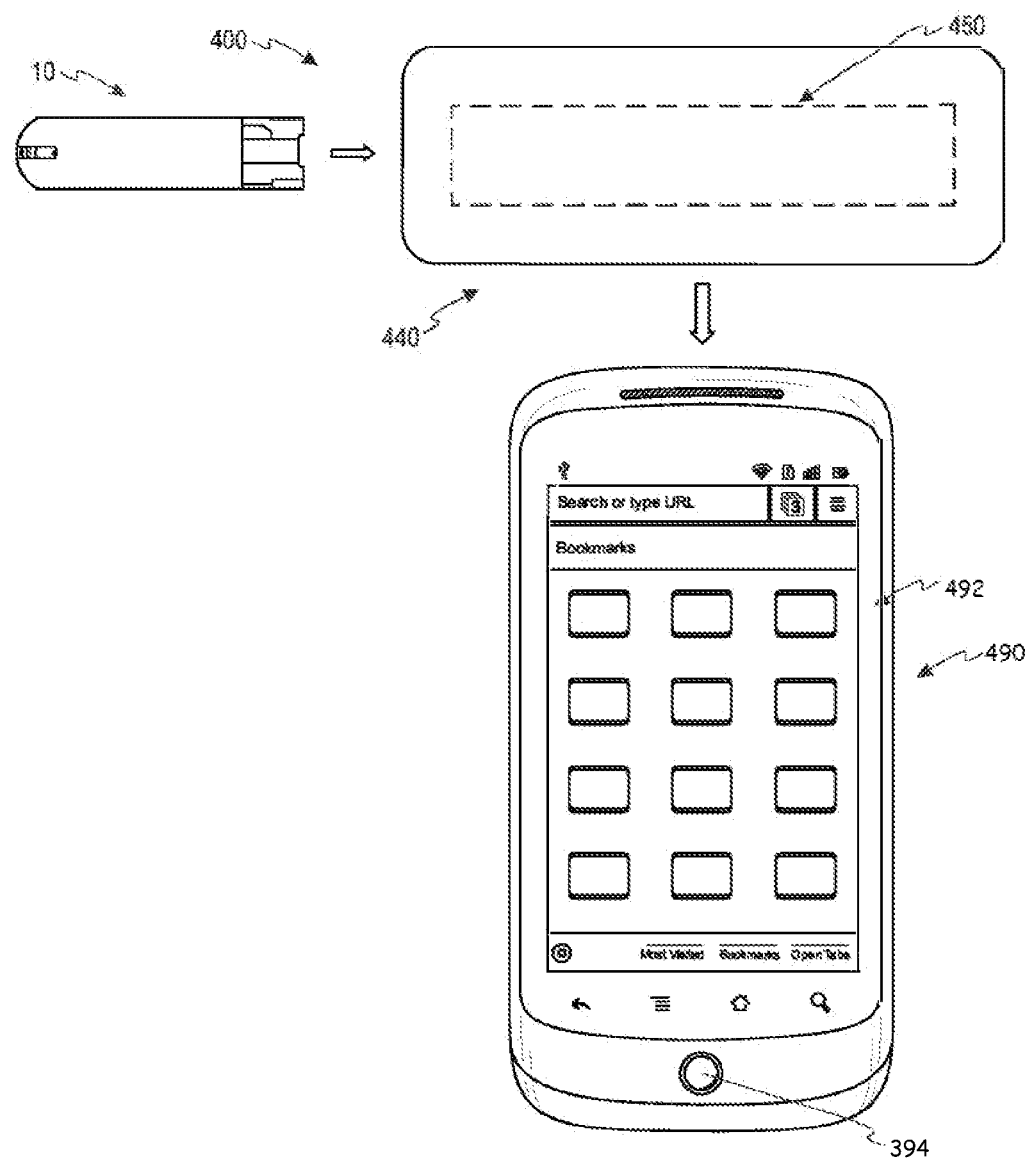
FIG. 6A is a system including the electrochemical test sensor of FIGS. 1A and 1C, a Bluetooth-enabled dongle and a Bluetooth-enabled host/reader according to one embodiment.
Figure 6B:
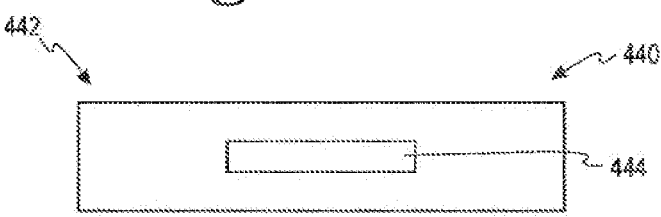
FIG. 6B is a front view of the Bluetooth-enabled dongle shown in FIG. 6A.

Referring to FIGS. 1A, 6A and 6B, a system 400 includes the electrochemical test sensor 10, a Bluetooth-enabled dongle 440 and a Bluetooth-enabled host/reader 490. The dongle in one embodiment is small and lightweight. The Bluetooth dongle can be made a bit heaver, if desired, to assist in improving ergonomic considerations. A non-limiting example of a Bluetooth-enabled dongle 440 is a Bluetooth low energy (BLE) dongle. It is contemplated that the Bluetooth-enabled dongle may use Bluetooth Classic (an older standard) instead of Bluetooth low energy (BLE), which is the newer standard.

The Bluetooth-enabled dongle 440 includes a Bluetooth chip 450, an analog front end (AFE) and a microcontroller. Referring to FIG. 6B, the Bluetooth-enabled dongle 440 includes an exterior covering 442. The exterior covering 442 is typically made of polymeric material. It is contemplated that the dongle may be made of other materials. The exterior covering 442 forms an opening 444 for receiving the electrochemical test sensor 10. The exterior covering 442 of the dongle assists in protecting the components contained therein.

The Bluetooth chip 450 may be secured to the Bluetooth-enabled dongle 440 by, for example, suitable adhesives and/or mechanical coupling mechanisms such as prongs. It is contemplated that other methods may be used in securing the Bluetooth chip to the Bluetooth-enabled dongle. The Bluetooth chip 450 in one embodiment is located in an interior of the Bluetooth-enabled dongle 440.

Bluetooth pairing occurs when two Bluetooth devices agree to communicate with each other and establish a connection. To pair two Bluetooth wireless devices, a password (passkey) is exchanged between the two devices. The passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol allows for a Wi-Fi device to pair directly with another without having to first join a local network. The method makes it possible to share data from a Bluetooth-enabled host/reader (e.g., a phone) and communicate directly, even when no router exists.

For example, Bluetooth includes a small antenna and hardware to communicate via the Bluetooth standard. Bluetooth is a known worldwide standard that provides wireless data connectivity within a fairly close proximity. Bluetooth is currently used for communication distances of less than about 100 meters, and more likely less than about 50 meters. In other embodiments, Bluetooth is typically used in communication distances of less than about 30 meters or less than 20 meters. In another embodiment, Bluetooth is more commonly used in communication distances of less than about 15 meters or about less than about 10 meters. The Bluetooth chip wirelessly communicates with the Bluetooth-enabled host/reader within a fairly close proximity.

Bluetooth allows for simplified transactions, data exchange, and connections within a certain proximity. Bluetooth Classic was formed in 1989, while BLE was formed in 2009. Bluetooth Classic operates at 2.400 GHz to 2.4835 GHz, with an over the air data rate of from 1-3 Mbit/s, and an application throughput from 0.7 to 2.1 Mbit/s. BLE operates at 2.400 GHz to 2.4835 GHz, with an over the air data rate of from 125 kbit/s to 2 Mbit/s and an application throughput from 0.27 to 1.37 Mbit/s. BLE uses a different set of channels than Bluetooth Classic. BLE uses less power consumption than Bluetooth Classic. Bluetooth's short range helps keep encrypted information private. Thus, a Bluetooth-enabled reader such as, for example, a smartphone, tablet, computer or kiosk can receive information from the Bluetooth-enabled dongle to assist in determining an analyte concentration.

Figure 7:
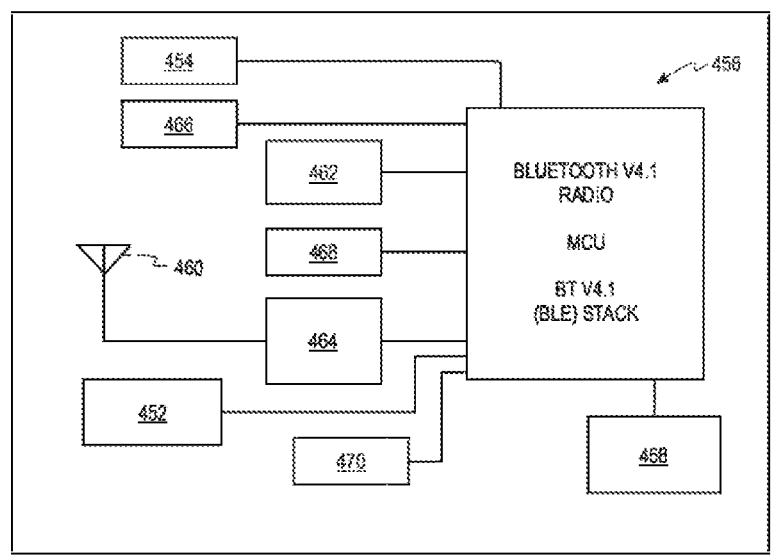
FIG. 7 is a schematic of a Bluetooth chip used in the system of FIG. 6A.

Referring specifically to FIG. 7, the Bluetooth chip 450 includes an analog front end (AFE) 452, a battery 454, a microcontroller unit 456, a real-time clock 458, an antenna 460, memory 462, filter 464, RF transceiver 466, and a plurality of crystals 468, 470. The microcontroller unit 456 includes many additional modules that are not shown in FIG. 7.

A non-limiting commercial example of a Bluetooth chip that uses Bluetooth Classic, which includes a microcontroller and an analog front end (AFE), that may be used in the present invention is the CC2564 family manufactured/marketed by Texas Instruments. A non-limiting commercial example of a Bluetooth chip that uses BLE, which includes a microcontroller and an analog front end (AFE), that may be used in the present invention is CYW20732A0 manufactured/marketed by Cypress Semiconductor.

The analog front end (AFE) 452 is used to drive the electrochemistry and sample the results. In one embodiment, the analog front end 452 applies voltage to the reagent area 28 that starts the electrochemical reaction between the reagent and the analyte in the fluid sample. The resulting current produced from the electrochemical reaction in this embodiment is sampled by the analog front end 452. This measured value of the current is wirelessly transmitted to the Bluetooth-enabled reader for further processing.

The AFE 452 is powered by the battery 454 located on the Bluetooth chip 450 as shown in FIG. 7. A non-limiting commercial example of an analog front end (AFE) that may be used in the present invention is AFE4400 manufactured/marketed by Texas Instruments of the USA.

The memory 462 of the Bluetooth chip 450 may be in the form of an EEPROM. One non-limiting example of memory that may be used is EEPROM. It is contemplated that other types of memory may be used. For example, flash memory may be used in the Bluetooth chip.

The microcontroller unit 456 in the Bluetooth-enabled dongle 440 executes operations involved with receiving and sending signals through the antenna 460 to the Bluetooth-enabled reader. The microcontroller unit 456 assists in controlling the analog front end (AFE) 452 and converting electrical signals to readable data. The microcontroller unit 456 directs the analog front end (AFE) 452 to start sampling. The Bluetooth-enabled dongle desirably includes a low-end microprocessor. The low-end microprocessor does not run one or more algorithms to determine analyte information of the fluid sample. A non-limiting commercial example of a microcontroller that may be used in the present invention is the LPC800 series manufactured/marketed by NXP Semiconductors of the Netherlands.

It is contemplated that the analog front end (AFE), microcontroller and Bluetooth chip may be separate chips or components. The Bluetooth chip in these embodiments would be considered a lower end chip. It is contemplated that two or more of these components may be integrated together. In one non-limiting example, the analog front end (AFE) and Bluetooth chip are integrated together. In another example, the microcontroller and the Bluetooth chip are integrated together. In a further example, the analog front end (AFE) and microcontroller are integrated together. It is contemplated that the analog front end (AFE), microcontroller and Bluetooth chip may all be integrated together such as shown with the Bluetooth chip 450 in FIG. 7.

In one embodiment, a system for determining analyte information (e.g., analyte concentration) includes an electrochemical test sensor, a Bluetooth-enabled dongle and a Bluetooth-enabled reader. The Bluetooth-enabled reader is configured to wirelessly receive data from the Bluetooth-enabled dongle to assist in determining the analyte concentration of the fluid sample. The electrochemical test sensor is adapted to receive a fluid sample including an analyte. The electrochemical test sensor comprises a base. The base includes an enzyme adapted to react with the analyte. The electrochemical test sensor further including a plurality of electrodes and a plurality of test sensor contacts. The Bluetooth-enabled dongle includes a Bluetooth chip, an analog front end (AFE) and a microcontroller. One non-limiting example of an electrochemical test sensor that may be used is the electrochemical test sensor 10. One non-limiting example that may be used is the Bluetooth-enabled dongle 440.

Referring back to FIG. 6A, the system 400 includes the electrochemical test sensor 10, the Bluetooth-enabled dongle 440 and the Bluetooth-enabled reader 490. Bluetooth-enabled readers can read Bluetooth chip information on the Bluetooth-enabled dongle to get information therefrom. The Bluetooth-enabled reader typically is a smartphone, tablet or computer. It is also contemplated that other Bluetooth-enabled readers may be used. For example, the Bluetooth-enabled reader may be a kiosk. The kiosk may be a kiosk specifically designed for use in determining an analyte concentration of a fluid sample. The kiosk may be useful in health care settings such as a hospital.

The Bluetooth-enabled reader 490 includes a display 492 and one or more buttons 394 or other mechanism for navigating the display 492. The display 492 is typically used to show analyte information or other information of the fluid sample. The display 492 may be analog or digital. The display 492 may be a LCD, a LED, an OLED, a vacuum fluorescent, or other display adapted to show numerical readings such as analyte information. It is contemplated that the analyte information (e.g., analyte concentration) may be conveyed in an audio communication from the Bluetooth-enabled reader.

To assist in determining analyte information (e.g., analyte concentration), in one embodiment, one or more algorithms are downloaded to the Bluetooth-enabled reader 490. Here, the Bluetooth-enabled reader is shown as a smartphone. As discussed above, the Bluetooth-enabled reader may be a tablet, computer or a kiosk. The Bluetooth-enabled reader using the one or more algorithms will take the raw data from the Bluetooth-enabled dongle that is wirelessly transmitted and calculate the analyte information. The one or more algorithms may be downloaded and stored in the Bluetooth-enabled reader.

In another embodiment, the Bluetooth chip in the Bluetooth-enabled dongle may include and transmit read-only data. This read-only data identifies the electrochemical test sensor to the Bluetooth-enabled reader. The reader recognizes the read-only data and runs the proper one or more algorithms to determine the analyte information (e.g., analyte concentration).

In a further embodiment, the Bluetooth-enabled reader may include log-in information for a user before using the algorithm to assist in collecting and categorizing the data. The data may be stored locally in the Bluetooth-enabled reader or may be sent externally to another storage location, such as a cloud-based storage location. It is contemplated that the data may be sent to other locations.

Figure 8:
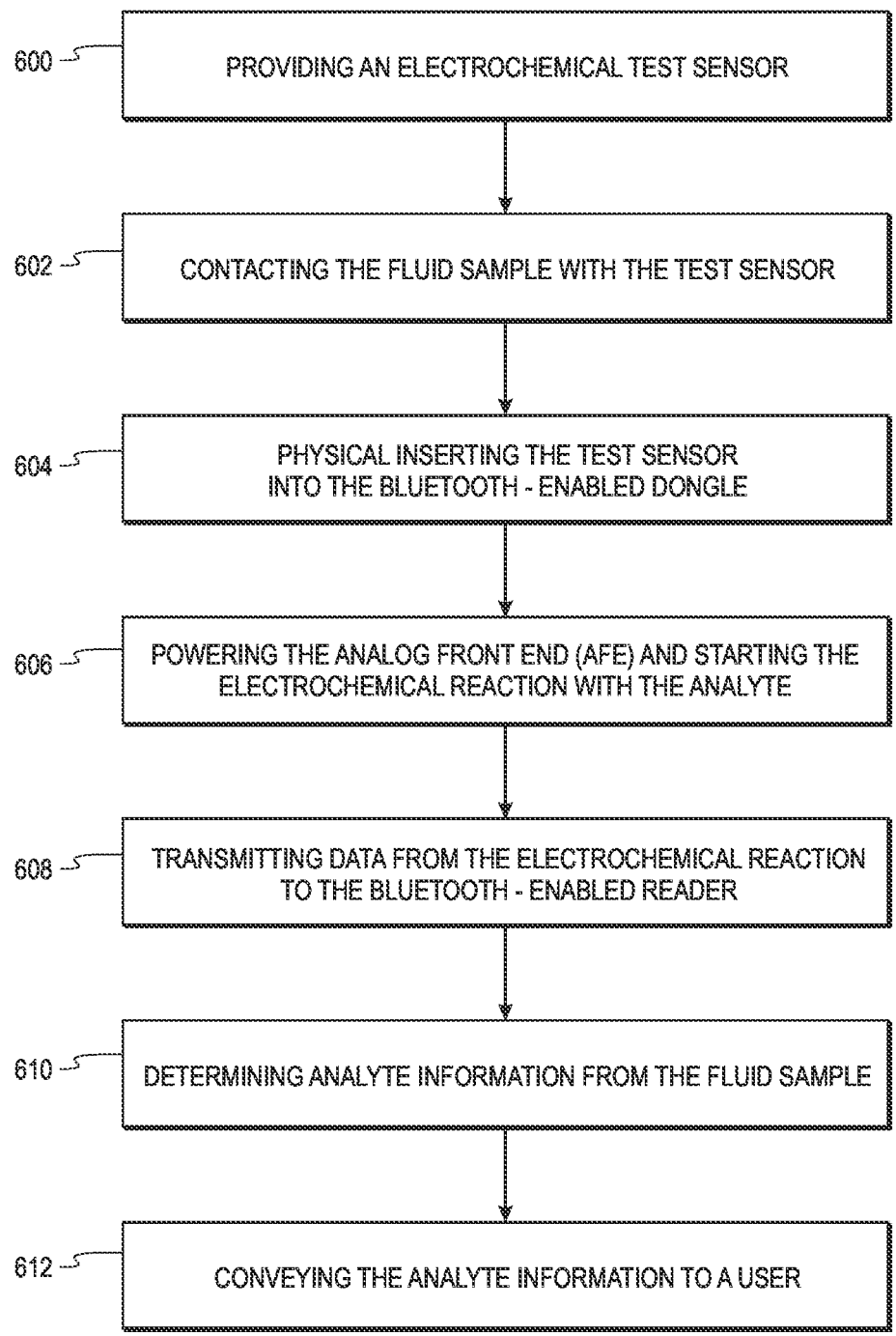
FIG. 8 is a flow chart of steps to determine analyte information according to another method.

One method is shown in the flowchart of FIG. 8 and includes steps for determining and conveying analyte information to a user. Referring to FIG. 8, step 600 provides an electrochemical test sensor. In step 602, the fluid sample contacts the electrochemical test sensor. Step 604 physical inserts the electrochemical test sensor into the Bluetooth-enabled dongle. Step 606 powers the analog front end (AFE) and starts the electrochemical reaction with the analyte. In step 608, data is transmitted from the electrochemical reaction to the Bluetooth-enabled reader. In step 610, analyte information (e.g., analyte concentration) is determined from the fluid sample. In step 612, the analyte information is conveyed to a user using the Bluetooth-enabled reader.

Before analyte information is determined, it is noted that pairing is performed one time between the Bluetooth-enabled dongle and the Bluetooth-enabled reader to establish a wireless connection between the two devices. The Bluetooth-enabled dongle and the Bluetooth-enabled reader will need to be in fairly close proximity to establish this pairing.

In this method, an electrochemical test sensor is provided to assist in determining analyte information. For example, the electrochemical test sensor that may be used is the electrochemical test sensor 10. The fluid sample contacts the reagent area 28 via the fluid-receiving area 16. In one method, the fluid sample is obtained by pricking a finger. In this case, the fluid sample is blood. The fluid sample may be obtained by other methods. It is contemplated that other fluids may be used.

The electrochemical test sensor is physical inserted into the Bluetooth-enabled dongle. In this method, the Bluetooth chip 450, including the analog front end (AFE) 452, is powered. This is accomplished by the use of the battery 454.

In one method, the Bluetooth-enabled dongle with the inserted electrochemical test sensor is brought or placed in close proximity to a Bluetooth-enabled reader to assist in transmitting the data. It is contemplated that the Bluetooth-enabled dongle may be brought or placed in a fairly close proximity to a Bluetooth-enabled reader and then the electrochemical test sensor is physical inserted into the Bluetooth-enabled dongle. Initiation is typically made by the Bluetooth-enabled reader when the Bluetooth-enabled reader and the Bluetooth-enabled dongle are in fairly close proximity. It is contemplated that the Bluetooth-enabled dongle may make the initiation with the Bluetooth-enabled reader.

Bluetooth is currently used for communication distances of about 100 meters or less, and more likely less than about 50 meters. In other embodiments, the Bluetooth is typically used in communication distances of less than about 30 meters or less than 20 meters. In another embodiment, Bluetooth is more commonly used in communication distances of less than about 15 meters or about less than about 10 meters. The Bluetooth chip of the Bluetooth-enabled dongle wirelessly communicates with the Bluetooth-enabled reader when in fairly close proximity.

The analog front end 452 assists in starting an electrochemical reaction with the analyte after receiving instructions from the microprocessor unit 456. After the reaction has started, wirelessly transmitting data from the electrochemical reaction via the Bluetooth chip of the Bluetooth-enabled dongle to the Bluetooth-enabled reader. The analyte information of the fluid sample is determined on the Bluetooth-enabled reader using the data received from the Bluetooth-enabled dongle and at least one algorithm. The algorithm may be stored on Bluetooth-enabled reader or in server farms in the cloud.

In one method, the analog front end (AFE) assists in starting the electrochemical reaction with the analyte by providing at least one voltage to the fluid sample resulting in current formed from the electrochemical reaction. The analog front end may provide an excitation signal to start the electrochemical reaction. During electrochemical analyses, an excitation signal is applied to the sample of the biological fluid. The excitation signal may be a potential or current and may be constant, variable, or a combination thereof. The excitation signal may be applied as a single pulse or in multiple pulses, sequences, or cycles. Various electrochemical processes may be used such as amperometry, coulometry, voltammetry, gated amperometry, gated voltammetry, and the like.

While the invention is susceptible to various modifications and alternative forms, specific embodiments and methods thereof have been shown by way of example in the drawings and are described in detail herein. It should be understood, however, that it is not intended to limit the invention to the particular forms or methods disclosed, but, to the contrary, the intention is to cover all modifications, equivalents, and alternatives falling within the spirit and scope of the invention.

What is claimed is:

1. A system for determining analyte information of a fluid sample, the system comprising:
   an electrochemical test sensor adapted to receive the fluid sample of an analyte, the electrochemical test sensor comprising:
   a base including an enzyme adapted to react with the analyte;
   a plurality of electrodes comprising:
   a working electrode for measuring a concentration of the fluid sample;
   a counter electrode; and
   at least one of a fill detection electrode or a hematocrit electrode; and
   a plurality of test sensor contacts; and
   a near field communication (NFC) dongle an algorithm from the plurality of algorithms
   an NFC chip;
   an analog front end;
   a temperature sensor;
   a microcontroller;
   a battery; and
   an exterior covering forming an opening for receiving the electrochemical test sensor,
   wherein the microcontroller is configured to be powered by the battery when the electrochemical test sensor is received in the opening, and wherein the microcontroller directs the analog front end to:
supply a voltage to a reagent area starting an electrochemical reaction when the microcontroller is powered by the battery upon receiving the electrochemical test sensor into the opening; and
sample a result produced from the electrochemical reaction producing a sampled result;
upon receiving a request to transmit the sampled result, transmit the sampled result and test sensor identification information,
wherein the test sensor identification information is indicative of the electrochemical test sensor; and
a Bluetooth-enabled reader configured to:
collect user identification information indicative of a user;
authenticate the user based on the user identification information, and upon authenticating the user:
obtain the sampled result and the test sensor identification information;
access a cloud-based storage storing a plurality of algorithms;
select, from the cloud-based storage, an algorithm based on the test sensor identification information;
run the algorithm to determine the analyte information of the fluid sample based on the sampled result; and
categorize the analyte information based on the user identification information.

2. The system of claim 1, wherein the Bluetooth-enabled reader is a smartphone, tablet, computer, or a kiosk.

3. The system of claim 1, wherein the Bluetooth-enabled reader displays the analyte information of the fluid sample.

4. The system of claim 1, wherein the Bluetooth-enabled reader includes log-in information.

5. The system of claim 1, wherein the electrochemical test sensor further includes a mediator.

6. A system for determining analyte information of a fluid sample, the system comprising:
an electrochemical test sensor adapted to receive the fluid sample of an analyte, the electrochemical test sensor comprising:
a base including an enzyme adapted to react with the analyte;
a capillary channel for receiving the fluid sample;
a plurality of electrodes comprising:
a working electrode configured for measuring a concentration of the fluid sample;
a counter electrode; and
a fill detection electrode; and
a plurality of test sensor contacts;
a Bluetooth-enabled dongle comprising:
a Bluetooth chip, comprising:
an analog front end;
a microcontroller; and
a battery; and
an exterior covering forming an opening configured for receiving the electrochemical test sensor,
wherein the microcontroller is configured to be powered by the battery when the electrochemical test sensor is received in the opening, and
wherein the microcontroller directs the analog front end to:
supply a voltage to a reagent area starting an electrochemical reaction when the microcontroller is powered by the battery upon receiving the electrochemical test sensor into the opening;
sample a result produced from the electrochemical reaction producing a sampled result; and
upon receiving a request to transmit the sampled result, transmit the sampled result and test sensor identification information,
wherein the test sensor identification information is indicative of the electrochemical test sensor; and
a Bluetooth-enabled reader configured to:
collect user identification information indicative of a user;
authenticate the user based on the user identification information, and upon authenticating the user:
obtain the sampled result and the test sensor identification information indicative of the electrochemical test sensor;
access a cloud-based storage storing a plurality of algorithms;
select, from the cloud-based storage, an algorithm from the plurality of algorithms based on the test sensor identification information;
run the algorithm to determine the analyte information of the fluid sample based on the sampled result; and
categorize the analyte information based on the user identification information.

7. The system of claim 6, wherein the Bluetooth-enabled reader is a smartphone, tablet or computer.

8. The system of claim 6, wherein the Bluetooth-enabled reader is a kiosk.

9. The system of claim 6, wherein the Bluetooth-enabled reader displays the analyte information of the fluid sample.

10. The system of claim 6, wherein the Bluetooth chip is adapted to include and transmit read-only data, the read-only data identifies the electrochemical test sensor transmitted to the Bluetooth-enabled reader to assist in determining the analyte information of the fluid sample.

11. The system of claim 6, wherein the electrochemical test sensor further includes a mediator.

12. The system of claim 6, wherein the Bluetooth-enabled dongle is formed in absence of a display and one or more buttons.

13. The system of claim 6, wherein the Bluetooth-enabled dongle is a Bluetooth Low Energy (BLE)-enabled dongle and wherein the Bluetooth chip is a BLE chip.

14. A method for determining analyte information of a fluid sample, the method comprising:
providing an electrochemical test sensor adapted to receive the fluid sample of an analyte, the electrochemical test sensor including a base, the base including an enzyme adapted to react with the analyte, the electrochemical test sensor further including a plurality of electrodes and a plurality of test sensor contacts;
providing a wireless communication-enabled dongle including a wireless communication chip, an analog front end (AFE), a battery, and a microcontroller, the wireless communication-enabled dongle including an exterior covering, the exterior covering forming an opening for receiving the electrochemical test sensor;
placing the electrochemical test sensor into electrical communication with the wireless communication-enabled dongle via the opening of the wireless communication-enabled dongle;
contacting the fluid sample with the electrochemical test sensor;
powering, by the battery and by inserting the electrochemical test sensor into the opening, the wireless communication chip, the microcontroller, and the analog front end (AFE), the microcontroller directing the analog front end to:
supply a voltage to a reagent area starting an electrochemical reaction when the microcontroller and the analog front end are powered; and
sample a result produced from the electrochemical reaction producing a sampled result;
obtaining, by a wireless communication-enabled reader, user identification information indicative of a user;
bringing the wireless communication-enabled dongle and the electrochemical test sensor in proximity to the wireless communication-enabled reader;
upon receiving the user identification information, wirelessly transmitting the sampled result and test sensor identification information from the wireless communication-enabled dongle via the wireless communication chip to the wireless communication-enabled reader,
wherein the test sensor identification information is indicative of the electrochemical test sensor;
receiving, by the wireless communication-enabled reader, the sampled result and the test sensor identification information;
authenticating the user based on the user identification information, and upon authenticating the user:
access a cloud-based storage storing a plurality of algorithms;
selecting, from the cloud-based storage, an algorithm from the plurality of algorithms based on the test sensor identification information;
determining the analyte information of the fluid sample via the wireless communication-enabled reader using the sampled result and the algorithm; and
categorizing the analyte information based on the user identification information.

15. The method of claim 14, wherein the fluid sample is blood.

16. The method of claim 14, wherein the wireless communication-enabled reader is a smartphone, tablet or computer.

17. The method of claim 14, wherein a proximity between the electrochemical test sensor and the wireless communication-enabled reader is less than about 10 cm.

18. The method of claim 14, wherein the analyte information of the fluid sample is an analyte concentration.

19. The method of claim 14, wherein the analyte information of the fluid sample is conveyed to the user via a display or an audio communication.

20. A method for determining analyte information of a fluid sample, the method comprising:
providing an electrochemical test sensor adapted to receive the fluid sample of an analyte, the electrochemical test sensor including a base, the base including an enzyme adapted to react with the analyte, the electrochemical test sensor further including a plurality of electrodes and a plurality of test sensor contacts;
providing a Bluetooth-enabled dongle including a Bluetooth chip, an analog front end (AFE), a battery, and a microcontroller, the Bluetooth-enabled dongle including an exterior covering, the exterior covering forming an opening for receiving the electrochemical test sensor;
placing the electrochemical test sensor into electrical communication with the Bluetooth-enabled dongle via the opening of the Bluetooth-enabled dongle;
contacting the fluid sample with the electrochemical test sensor;
powering the Bluetooth chip and the analog front end (AFE) by the battery when the electrochemical test sensor is received in the opening, the microcontroller directing the analog front end to:
supply a voltage to a reagent area starting an electrochemical reaction when the microcontroller and the analog front end are powered; and
sample a result produced from the electrochemical reaction producing a sampled result;
obtaining, by a Bluetooth-enabled reader, user identification information indicative of a user;
bringing the Bluetooth-enabled dongle in proximity to the Bluetooth-enabled reader;
upon receiving the user identification information, authenticating the user based on the user identification information;
upon authenticating the user:
wirelessly transmitting the sampled result and test sensor identification information from the Bluetooth-enabled dongle via the Bluetooth chip to the Bluetooth-enabled reader,
wherein the test sensor identification information is indicative of the electrochemical test sensor;
receiving, by the Bluetooth-enabled reader, the sampled result and the test sensor identification information;
access a cloud-based storage storing a plurality of algorithms;
selecting, from the cloud-based storage, an algorithm from the plurality of algorithms based on the test sensor identification information;
determining the analyte information of the fluid sample via the Bluetooth-enabled reader using the sampled result and the algorithm; and
categorizing the analyte information based on the user identification information.

* * * * *